(12) United States Patent
Kato

(10) Patent No.: US 7,035,022 B2
(45) Date of Patent: Apr. 25, 2006

(54) OBSERVATION OPTICAL SYSTEM AND OPTICAL APPARATUS

(75) Inventor: Yumiko Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 10/428,429

(22) Filed: May 2, 2003

(65) Prior Publication Data

US 2003/0210468 A1    Nov. 13, 2003

(30) Foreign Application Priority Data

May 7, 2002    (JP)    .............................. 2002-132047

(51) Int. Cl.
*G02B 3/08*    (2006.01)

(52) U.S. Cl. ...................... 359/742; 359/570; 359/601; 359/614; 359/707; 359/605; 359/606; 359/737

(58) Field of Classification Search ................ 359/570, 359/601, 614, 722, 742, 743, 707, 605, 606, 359/737

See application file for complete search history.

(56) References Cited

U.S. PATENT DOCUMENTS

| 5,442,481 A | * | 8/1995 | Hasushita | .................... | 359/614 |
| 2002/0015232 A1 | * | 2/2002 | Nakai | .......................... | 359/569 |
| 2002/0089750 A1 | | 7/2002 | Hoshi | .......................... | 359/566 |
| 2002/0097497 A1 | * | 7/2002 | Kamo | .......................... | 359/629 |
| 2002/0135869 A1 | * | 9/2002 | Banish et al. | ................ | 359/350 |
| 2003/0174201 A1 | * | 9/2003 | Kimura | ....................... | 347/258 |
| 2004/0032667 A1 | * | 2/2004 | Gale et al. | ................... | 359/642 |

FOREIGN PATENT DOCUMENTS

| JP | 7-77730 | 3/1995 |
| JP | 8-179400 | 7/1996 |
| JP | 2002-98915 | 5/2002 |

* cited by examiner

*Primary Examiner*—Evelyn A. Lester
(74) *Attorney, Agent, or Firm*—Morgan & Finnegan L.L.P.

(57) ABSTRACT

An observation optical system is disclosed with which the Fresnel reflection at the surfaces of optical members can be reduced, the transmittance can be improved, and the surface reflection ghost that occur among a plurality of optical surfaces can be suppressed. The observation optical system of the present invention comprises a plurality of optical surfaces, and a fine periodic structure, with a period smaller than the wavelength of incident light, is provided at an effective optical region of at least one surface among the aforementioned plurality of optical surfaces.

9 Claims, 16 Drawing Sheets

OBSERVATION OPTICAL SYSTEM AND OPTICAL APPARATUS

BACKGROUND OF THE INVENTION

1. Field of the Invention

The present invention relates to an observation optical system to be used as a viewfinder optical system of a still camera or video camera or to be used in binoculars, etc.

2. Description of the Relating Art

Previously, various methods of suppressing reflection in an optical system have been proposed. The following anti-reflection methods are known as methods for obtaining a good field of view in a viewfinder optical system of a still camera, video camera, etc.

First, as an arrangement, in which an anti-reflection film of $MgF_2$, $SiO_2$, etc. is applied to a predetermined optical surface in order to suppress the occurrence of ghosts due to surface reflection by a lens surface, Japanese Laid-Open Patent Publication No. 1995-77730 (corresponding to U.S. Pat. No. 5,442,481) proposes a viewfinder optical system in which an anti-reflection film is applied to the surface of an objective lens.

Japanese Laid-Open Patent Publication No. 1996-179400 proposes a viewfinder optical system, with which multiple reflection is suppressed by adding an anti-reflection film to either of two prism surfaces that sandwich a minute air interval.

Though an anti-reflection film is known to provide the effects of suppressing Fresnel reflection at a lens surface and thereby improving the transmittance of the lens, with plastic materials used in prior viewfinder optical systems, the surface reflection was of a negligible level due to the low refractive index and the tolerance of the human eye to ghost light.

However, as cameras are being made more compact in recent years, compact viewfinder optical systems are coming in demanded. For compact size, the lenses that make up a viewfinder optical system must be positioned closer to each other. Also in order to correct the various aberrations that tend to be generated as the size is made more compact, there is a tendency for an increased number of objective lenses and ocular lenses.

The decrease of transmittance due to the Fresnel reflection at lens surfaces becomes non-negligible as the number of lenses increase.

Also due to the lenses being positioned closer to each other, so-called surface reflection ghost, which is ghost caused by the light rays that are reflected among the lens surfaces, occurs. Though the lenses can be positioned at adequate lens intervals in order to suppress the occurrence of surface reflection ghost, this will prevent the requirement of the compact size of the viewfinder optical system or camera from being met.

An anti-reflection film may be applied to the optical surfaces in order to suppress reflection by the lens surfaces while maintaining compact size. As indicated in Japanese Laid-Open Patent Publication No. 1995-77730 (corresponding to U.S. Pat. No. 5,442,481) and Japanese Laid-Open Patent Publication No. 1996-179400, when an anti-reflection film is applied to a lens surface of a plastic lens and this anti-reflection film is to be a single-layer film made from $MgF_2$, $SiO_2$, etc. are generally used. However, since these materials are weak in adhesion to plastic, in many actual cases, a plastic film for improving the adhesion is formed on the surface of the plastic lens in advance, and the above-mentioned anti-reflection film is applied above this plastic film.

In some cases, a protective film layer for improving wear resistance, surface hardness, etc. is also be provided additionally.

Also, in forming an above-described anti-reflection film on an optical member made of a plastic material, since the optical member may deform due to heating, vapor deposition at high temperature could not be performed and this presented a disadvantage in terms of durability.

Thus with the prior-art methods of suppressing reflection, even if inexpensive plastic materials are used in optical members, the provision of coating lead to increases in cost as well as an increase in manufacturing processes, and an anti-reflection structure of stable quality could not be obtained in some cases.

An anti-reflection structure for a viewfinder optical system or other observation optical system is thus required which will not lead to increase size or cost and to enable stable quality to be obtained without an increase in manufacturing processes.

SUMMARY OF THE INVENTION

An object of the present invention is to provide an observation optical system with which the Fresnel reflection at the surfaces of optical members is reduced to improve the transmittance and enable suppressing of the occurrence of surface reflection ghost that occur among a plurality of optical surfaces.

In order to achieve the above objective, the observation optical system of the present invention includes a plurality of optical surfaces, and a fine periodic structure, with a period smaller than the wavelength of the incident light, is provided on the effective optical region of at least one surface among the abovementioned plurality of optical surfaces.

The characteristics of the observation optical system in the present invention will be clarified by a description of the specific embodiments below with reference to the attached drawings.

DETAILED DESCRIPTION OF THE PREFERRED EMBODIMENTS

Hereinafter, preferred embodiments of the invention will be described in detail with reference to the drawings.

The function of suppressing reflection is known as a characteristic of a fine periodic structure. By providing a base member with a fine periodic structure of a period that is smaller than an incident wavelength(using wavelength), the reflection at the surface of the base member is suppressed.

Figure 12:
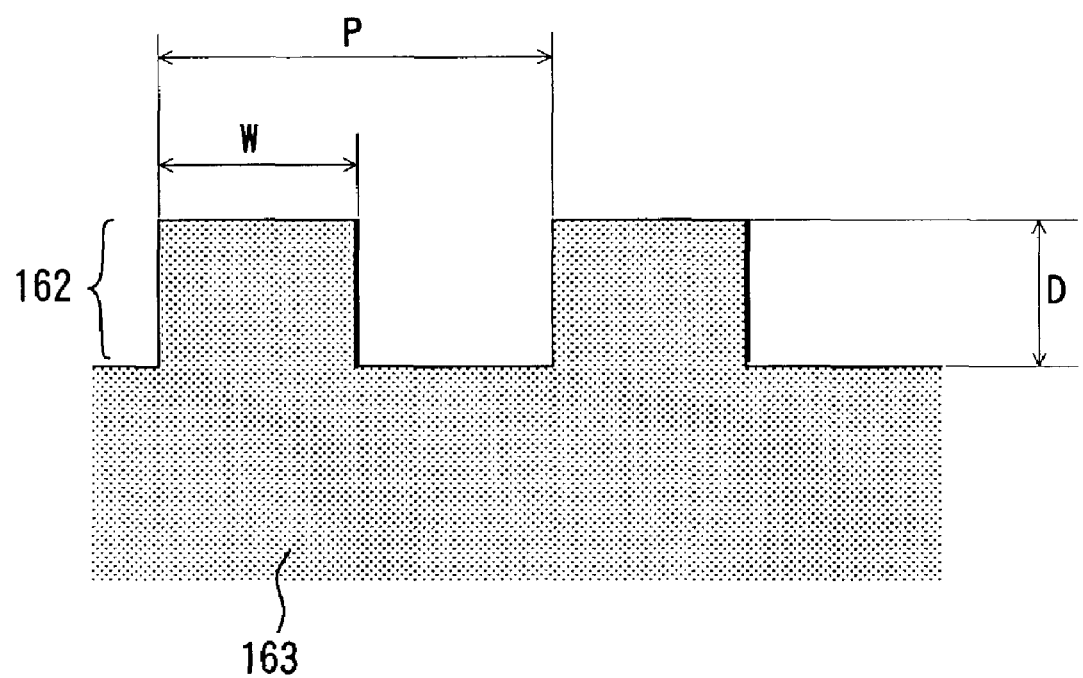
FIG. 12 is a sectional view of an anti-reflection functional element having a fine periodic structure of substantially rectangular shape.

For example, FIG. 12 shows a schematic view of a fine periodic structure 162 of substantially rectangular shape that is provided on a substrate (base member) 163. This fine periodic structure has a periodic structure only in a one-dimensional direction (the left-right direction in the Figure) and has a cross-sectional shape of substantially rectangular shape. PMMA (polymethylmethacrylate; refractive index n=1.492) is used as the substrate material, the grating period P is set to 0.2 µm, the grating depth (height) D is set to 0.1 µm, and the filling factor W/P, which indicates the ratio of the substrate material at the grating part, is set to 0.5.

Figure 13:
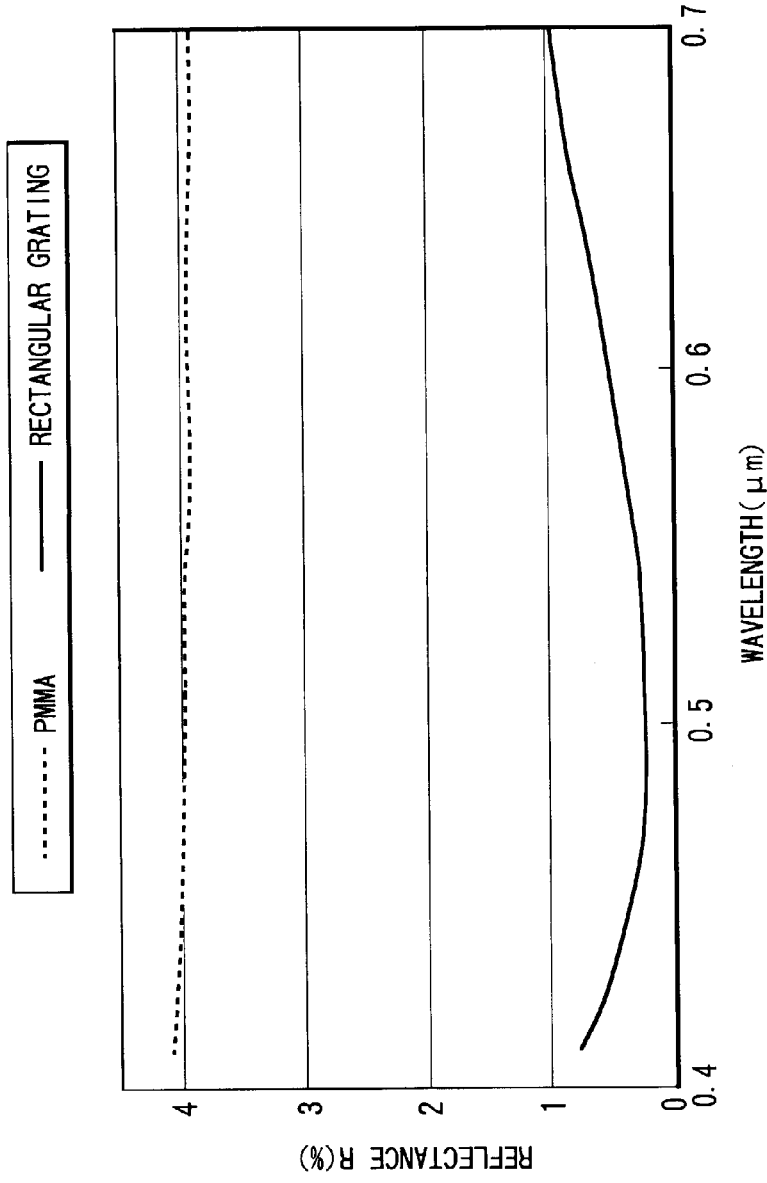
FIG. 13 is a graph, showing the reflectance characteristics of the anti-reflection functional element having the fine periodic structure of substantially rectangular shape.

FIG. 13 shows the reflectance characteristics for a case where a fine periodic structure of substantially rectangular shape, such as that shown in FIG. 12, is provided on a substrate. Here, PMMA was used as the material. The reflectance was calculated by Rigorous Coupled-Wave Analysis method, which is based on vector diffraction theory.

This is because in a region in which the grating period of a fine periodic structure is small compared to the incident wavelength, the scalar diffraction theory does not hold true as an approximation and does not enable Rigorous determination of the reflectance.

In FIG. 13, the abscissa indicates the wavelength of the incident light and the ordinate indicates the reflectance. The dotted line indicates the reflectance characteristics of only the PMMA substrate and the solid line indicates the reflectance characteristics in a case where a fine periodic structure 162 of substantially rectangular shape is provided on the surface of a PMMA substrate 163. This Figure shows that by providing the fine periodic structure 162 on the surface of the substrate 163, the reflectance is reduced.

Figure 14:
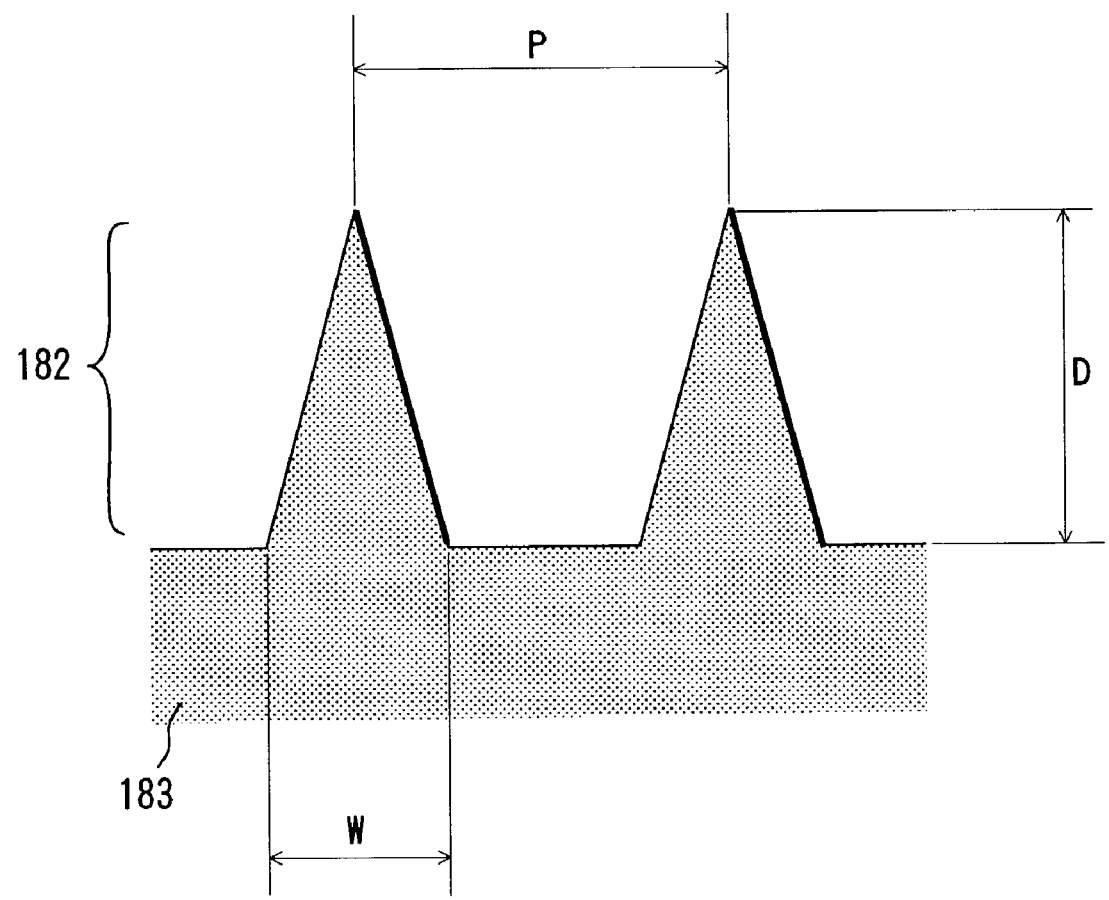
FIG. 14 is a sectional view of an anti-reflection functional element having a fine periodic structure of substantially triangular grating shape.

Also as another example of a fine periodic structure, FIG. 14 shows a schematic view of fine periodic structure 182 of substantially triangular grating shape that is provided on a substrate 183. This fine periodic structure has a periodic structure in only a one-dimensional direction and the cross-sectional shape thereof is a substantially triangular grating shape. Here, PMMA is used as the material of the substrate 183, the grating period P is set to 0.2 µm, the grating width W is set to 0.1 µm, and the grating depth D is set to 0.19 µm.

Figure 15:
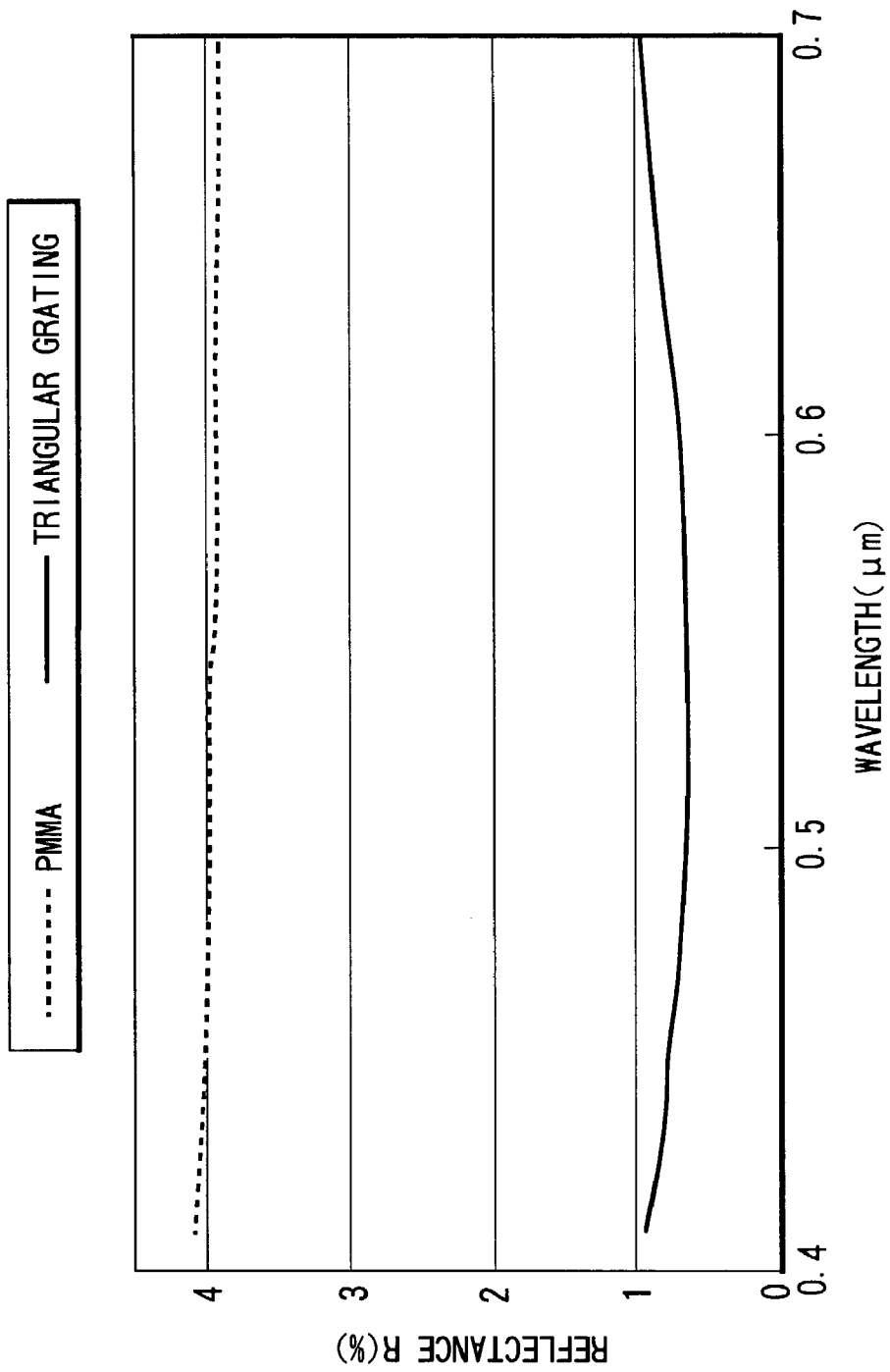
FIG. 15 is a graph, showing the reflectance characteristics of the anti-reflection functional element having the fine periodic structure of substantially triangular grating shape.

FIG. 15 shows, for comparison, the reflectance of the PMMA substrate itself and the reflectance of a case where the fine periodic structure 182 of substantially triangular grating shape is provided on the surface of the substrate 183. With this Figure, the abscissa indicates the wavelength of the incident light, the ordinate indicates the reflectance, and the Rigorous Coupled-Wave Analysis method was used to calculate the reflectance. FIG. 15 shows that by the provision of the fine periodic structure 182 on the surface of the substrate 183, the reflectance is reduced.

As described above, when a fine periodic structure is provided, a reduction of the reflectance is seen in comparison to the reflectance (scalar calculation) of a PMMA substrate that is not provided with a fine periodic structure. That is, by providing a fine periodic structure on a substrate surface, the reflectance of the substrate can be reduced.

Such a fine periodic structure can be manufactured using, for example, the method of direct drawing using an electron beam or a method such as reactive ion etching (RIE), etc.

In a region where the grating period P is of approximately the same magnitude as the incident wavelength (resonance region), strong polarization characteristics, strong wavelength dependence, and generation of high-order diffraction light, which are characteristic of the region, are observed, making it difficult to achieve the desired anti-reflection performance, and in a case of actual application to an optical system, the high-order diffraction light may become a cause of stray light.

In order to avoid the generation of such high-order diffraction light, it is preferable to provide a fine periodic structure with a grating period P which is adequately small with respect to the incident wavelength, such as approximately ½ to ¹⁄₁₀ the incident wavelength (in a case where the incident light has a wavelength in the visible range, 45 nm≦P≦320 nm).

Also, though a so-called rectangular shape structure, with a period in just a one-dimensional direction as described above, is representative of a fine periodic structure, the fine periodic structure is not limited thereto and may be a two-dimensional fine periodic structure, such as a grating structure, with which the grating shape on the x-y plane is a square or rectangular shape. The grating shape, grating period, grating width, and grating depth are set to optimal values for providing the desired optical performance.

Specific embodiments, with which an above-described fine periodic structure is provided as a reflection suppressing structure in a viewfinder optical system to be used in a camera, shall now be described.

Embodiment 1

Figure 1:
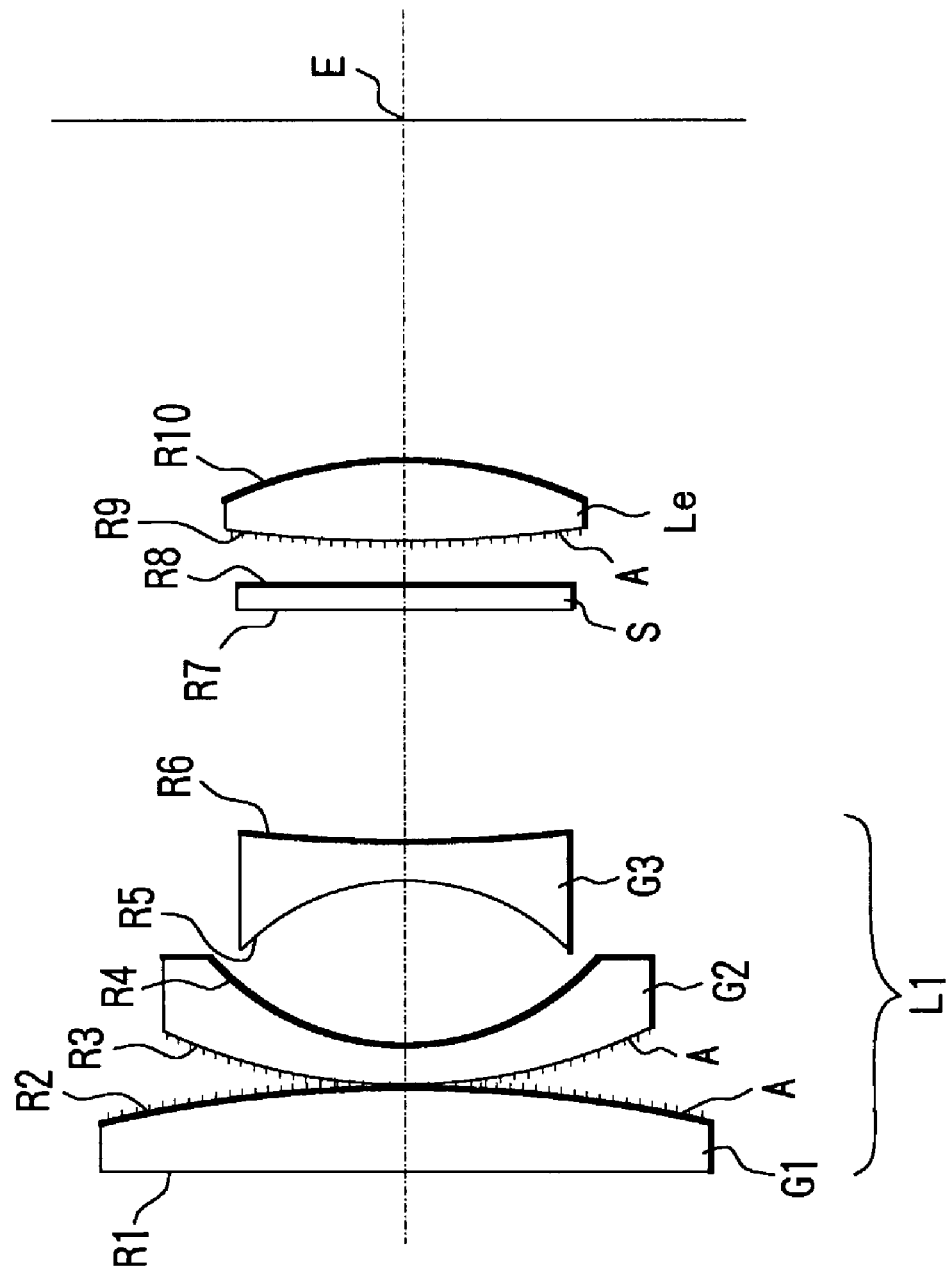
FIG. 1 is a sectional view of the principal parts of a viewfinder optical system of Embodiment 1 of the present invention.

FIG. 1 shows a sectional view of the principal parts of a viewfinder optical system of Embodiment 1 of the present invention. This viewfinder optical system is a viewfinder optical system for a camera having an objective optical system separated from an image-taking optical system, and in the Figure, the left side is the object side and the right side is the side of a pupil of an observer (image plane side).

L1 denotes an objective lens unit that has a negative refractive power as a whole and comprises, in order from the object side to the image plane side, a first lens element G1, having a positive optical power (optical power is the reciprocal of the focal length of the lens element), a second lens element G2, having a negative optical power, and a third lens element G3, having a negative optical power.

Le denotes an ocular lens unit and the ocular lens unit Le comprises a single lens having a positive optical power.

The material of all of the lens elements G1, G2, and G3 and the ocular lens unit Le is PMMA.

S denotes a frame plate, with which viewfinder information, such as the field frame (viewfinder field frame), etc., are formed by aluminum vapor deposition on the object side surface of a flat plate. A field image (viewfinder image), which is an erect and orthoscopic image, is observed from a reference eye point E via the ocular lens unit Le.

A real-image Albada system is employed with which a half mirror or other reflecting member is provided at the lens surface R6 positioned closest to the image plane side of the objective lens unit L1 to enable the finder information formed by vapor deposition on the frame plate S to be observed in an overlapping manner along with the field image (viewfinder image).

With the present embodiment, fine periodic structures A are provided at the R2 surface, the R3 surface, and the R9 surface, which are especially effective for suppressing the occurrence of surface reflection ghost. Since the fine periodic structures A are expressed schematically in exaggerated manner in the Figure, each of them differs in size and shape from an actual fine periodic structure having a reflection suppressing function.

For example, the R2 surface opposes the R1 surface, the R3 surface and the R4 surface, and ghost may occur with any pair of these opposing surfaces. Thus by providing the fine periodic structure A at the effective optical region (the region through which light rays that are effective for viewfinder observation pass) of at least the R2 surface among such pairs of opposing surfaces, the surface reflection can be reduced adequately.

Likewise, the R3 surface opposes the R2 surface, the R4 surface and the R5 surface, and ghost may occur with any pair of these opposing surfaces. The fine periodic structure A is thus provided at the effective optical region of at least the R3 surface among such pairs of opposing surfaces.

Also, since the R9 surface of the ocular lens unit Le, which is the optical member closest to the primary image forming plane (substantially at the position of the frame plate S) of the viewfinder optical system of the present embodiment, opposes the R6 surface, the R7 surface and the R8 surface, ghost may occur with any pair of these opposing surfaces. The fine periodic structure A, having a reflection suppressing function, is thus provided at the effective optical region of at least the R9 surface among such pairs of opposing surfaces.

With the present embodiment, the fine periodic structure is formed integral to the lens (PMMA), which is the substrate. Thus in comparison to a case where a film, having a fine periodic structure formed thereon, is adhered onto a lens, the manufacturing processes and cost can be reduced more readily, and the fine periodic structure may be provided on all surfaces except vapor-deposited surfaces. Also, the abovementioned problems of durability and processability in regard to an anti-reflection film can be resolved while realizing the desired optical performance even with a plastic material, such as PMMA.

Here, the refractive index n of the fine periodic structure A is preferably set so that:

$$1.2 \leq \sqrt{n} \leq 1.27$$

The above defines a refractive index that is nearly the same as that of a plastic material that generally forms a lens or prism, etc. That is, such a refractive index is obtained when a fine periodic structure A is integrally formed on an optical member, such as a lens, etc.

Embodiment 2

Figure 2:
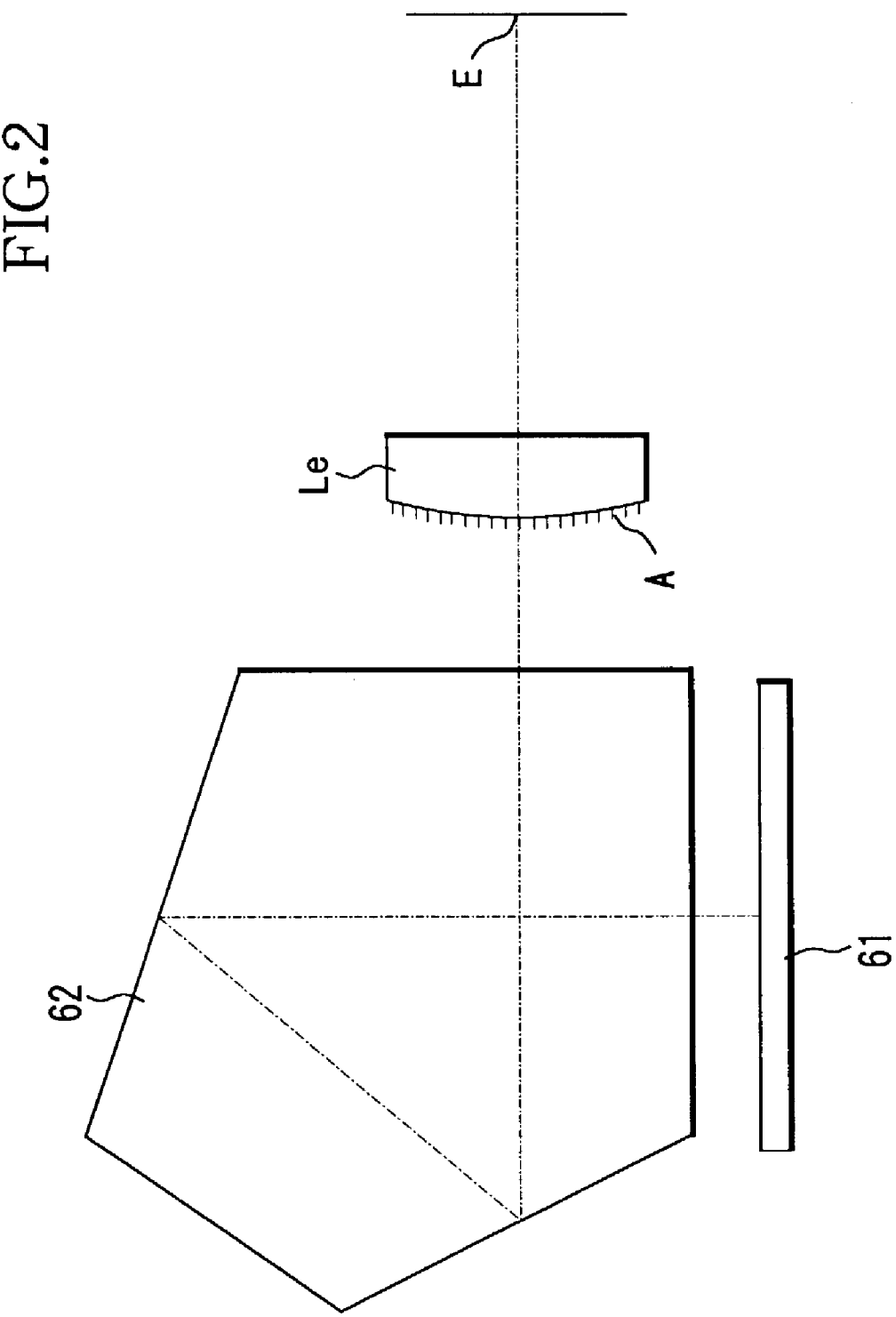
FIG. 2 is a sectional view of the principal parts of a viewfinder optical system of Embodiment 2 of the present invention.
Figure 3:
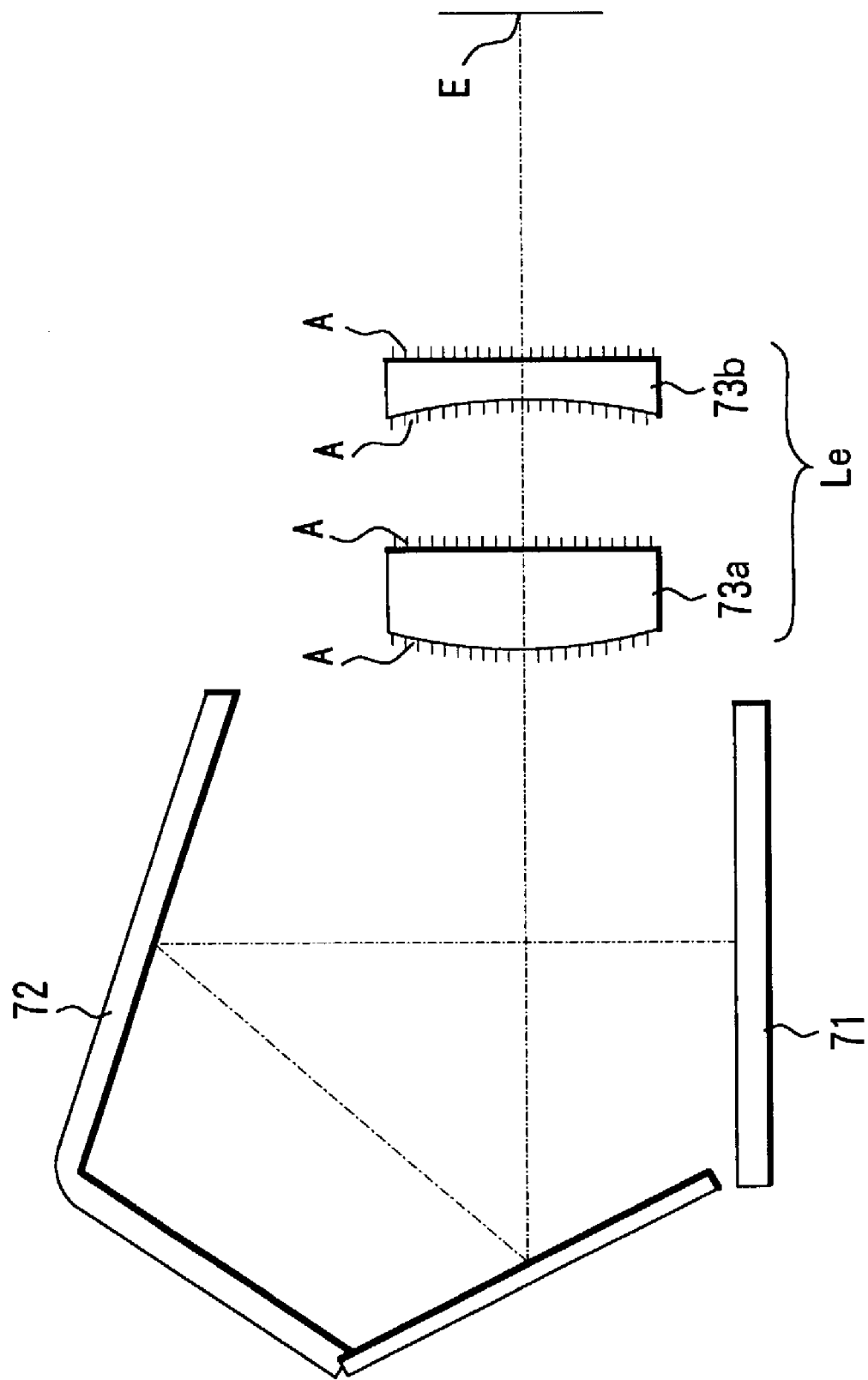
FIG. 3 is a sectional view of the principal parts of another viewfinder optical system of Embodiment 2 of the present invention.

Both FIG. 2 and FIG. 3 show sectional view of the principal parts of a viewfinder optical system of a single-lens reflex camera, which is Embodiment 2 of the present invention.

The viewfinder optical system of FIG. 2 is disposed within an optical path from a focus plate 61, onto which light that has been guided by a mirror from an unillustrated image-taking optical system is made incident, to an eye point E, and is equipped with an image inversion member 62, comprising a pentaprism that performs image inversion by making use of reflection, and an ocular lens unit Le, comprising a single lens element of plastic material. With this viewfinder optical system, the same fine periodic structure A as that described with Embodiment 1 is formed at the effective optical region of the object side surface (incident surface) of the ocular lens unit Le as an integral part of the ocular lens unit (single lens element) Le.

The viewfinder optical system of FIG. 3 is disposed within an optical path from a focus plate 71 to an eye point E and is equipped with an image inversion member 72, which makes use of reflection to perform image inversion and is arranged by combining a plurality of mirrors, and an ocular lens unit Le, comprising lens elements 73a and 73b that are formed of a plastic material. With this viewfinder optical system, the same fine periodic structures A as that described with Embodiment 1 are formed at the effective optical regions of the object side surface (incident surface) and the image plane side surface (emergent surface) of the lens element 73b, which is disposed at the image plane side (the side of the pupil of an observer) in the ocular lens unit Le, as integral parts of the lens element 73b. Fine periodic structures A are also formed at the effective optical regions of the object side surface (incident surface) and image plane side surface (emergent surface) of the lens element 73a, which is disposed at the object side in the ocular lens unit Le, as integral parts of the lens element 73a.

Figure 4:
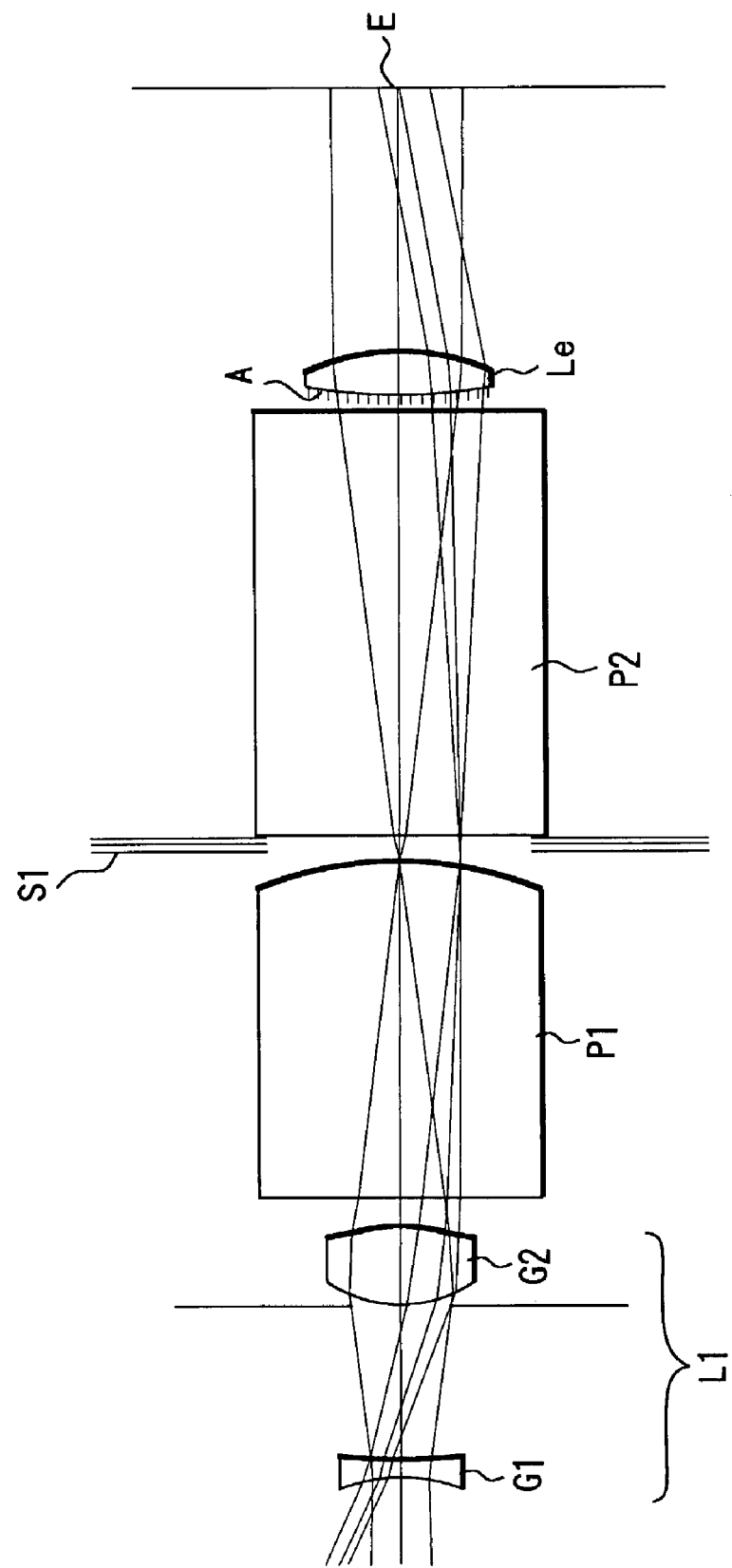
FIG. 4 is a sectional view of the principal parts of yet another viewfinder optical system of Embodiment 2 of the present invention.

Furthermore, FIG. 4 shows a sectional view of the principal parts of a viewfinder optical system for a camera having an objective optical system separated from an unillustrated image-taking optical system. This viewfinder optical system comprises, in order from the object side, an objective lens unit L1, prisms P1 and P2, a field frame S1, and an ocular lens unit L3, comprising a single lens element of plastic material. In FIG. 4, the prisms P1 and P2 are indicated as blocks that are developments of the prisms. With this viewfinder optical system, the same fine periodic structure A as that described with Embodiment 1 is formed at the effective optical region of the object side surface (incident surface) of the ocular lens unit Le as an integral part of the ocular lens unit (single lens element) Le.

With each of the viewfinder optical systems shown in FIG. 2 through FIG. 4, the surface reflection ghost, which result from the detrimental light that enters in reverse from the image plane side at the right side of the Figure, can be eliminated by the provision of the fine periodic structure A at each of the abovementioned optical surfaces. Moreover, since each of the fine periodic structures A is formed integral to the ocular lens unit Le, a viewfinder that is easy to view can be provided without increased cost.

Also, if in an arrangement as shown in FIG. 2 through FIG. 4, an illustrated cover plate is disposed at the outer side of the ocular lens unit, the fine periodic structure A may be provided at one surface or both surfaces of the cover plate.

Embodiment 3

Figure 6:
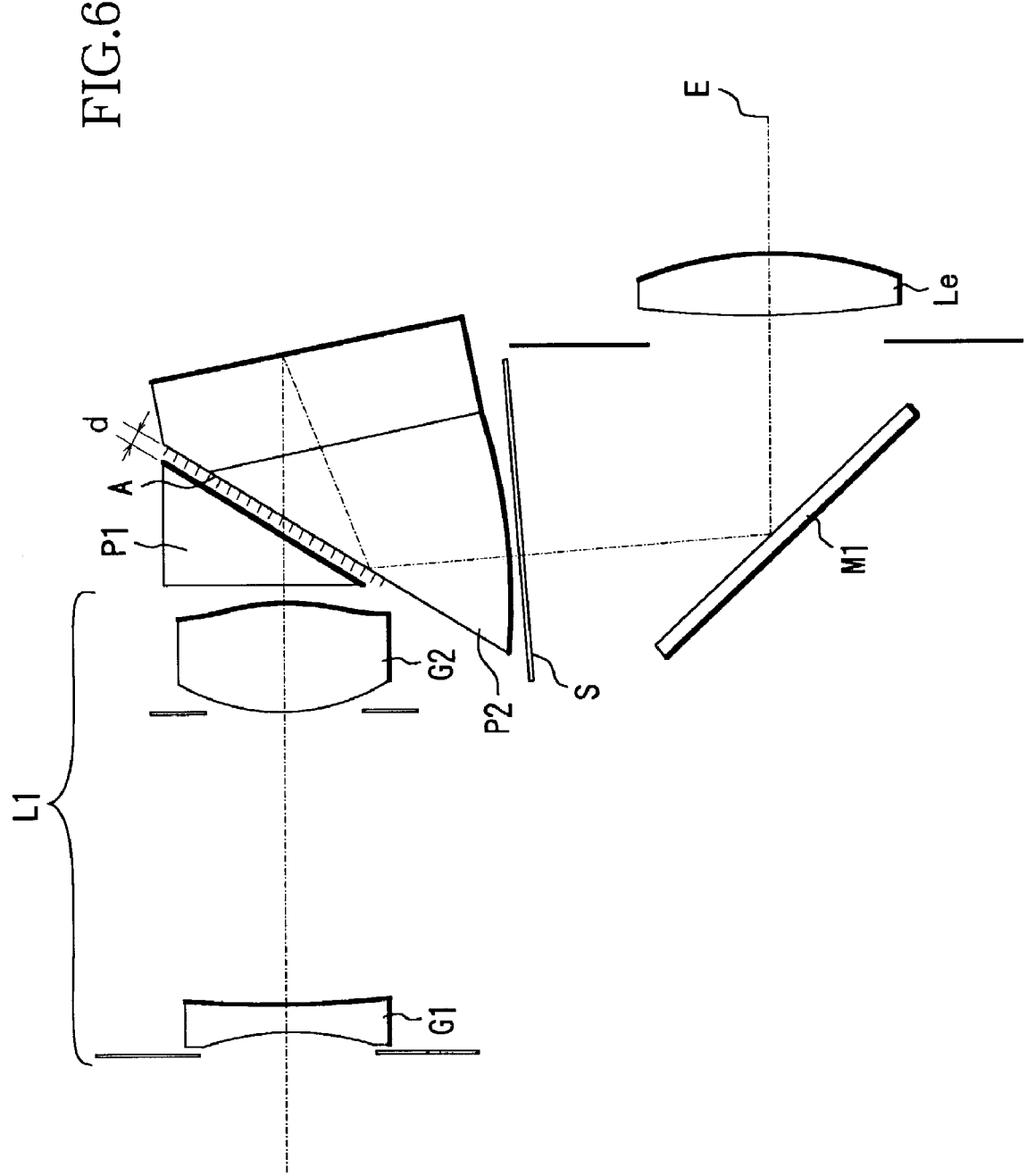
FIG. 6 is a sectional view of the principal parts of a viewfinder optical system of Embodiment 3 of the present invention.
Figure 7:
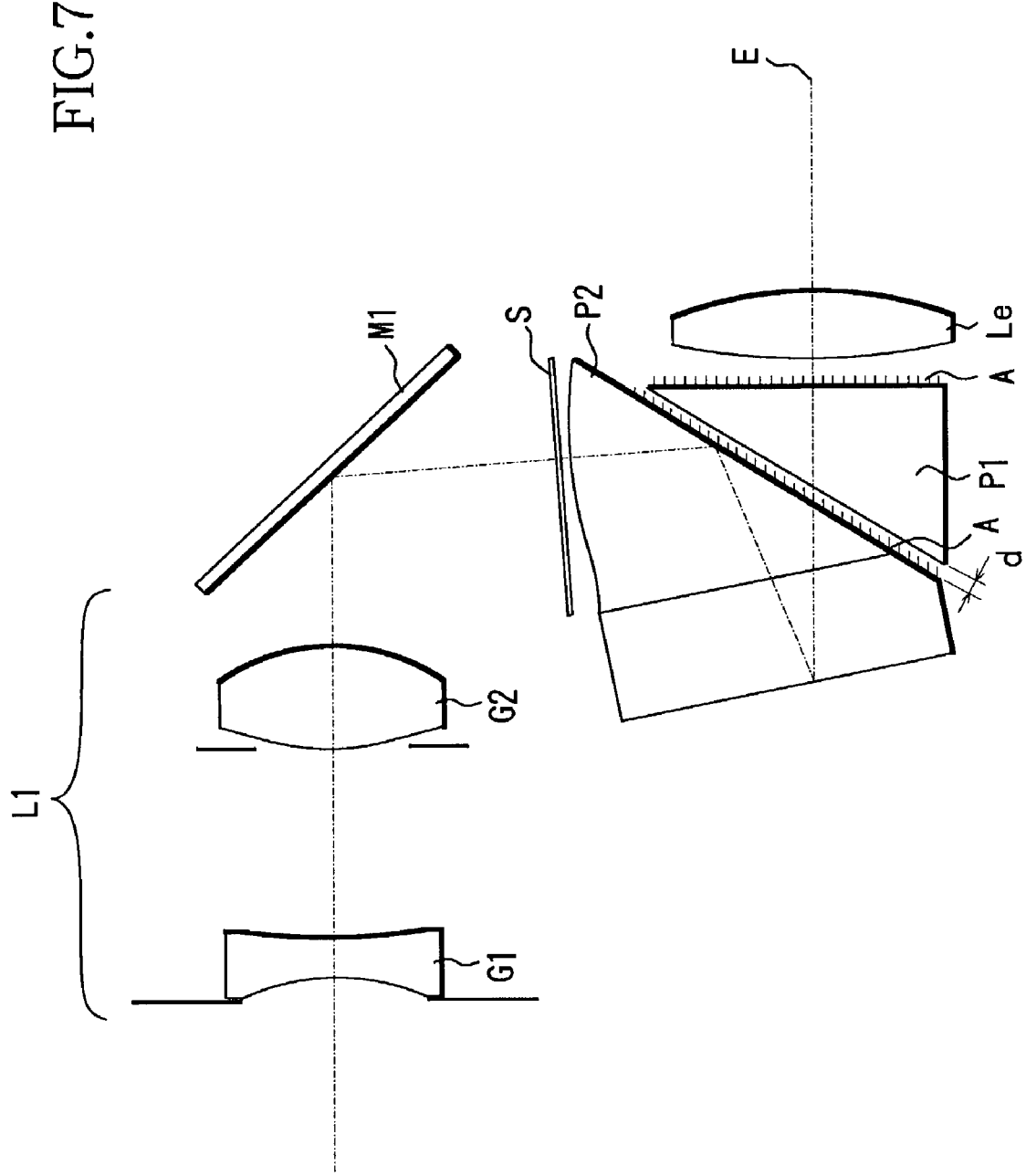
FIG. 7 is a sectional view of the principal parts of another viewfinder optical system of Embodiment 3 of the present invention.

Each of FIG. 6 and FIG. 7 shows a sectional view of the principal parts of a viewfinder optical system of Embodiment 3 of the present invention. With each of these viewfinder optical systems, an object image that is formed near a frame plate S by an objective lens unit (comprising a lens elements G1 and G2) L1 is observed from an eye point E via an ocular lens unit (comprising a single lens element) Le.

An image inversion member, comprising plastic prisms P1 and P2 that are disposed with a minute air interval d therebetween, is disposed in the optical path from the objective lens unit L1 to the ocular lens unit Le. In FIG. 6, light emerging from the prisms P1 and P2 is bent in an optical path by a high-reflection mirror M1 and guided to ocular lens unit Le, and in FIG. 7, the light emerging from the objective lens unit L1 is bent in an optical path by the high-reflection mirror M1 and guided to the prisms P1 and P2.

Figure 5:
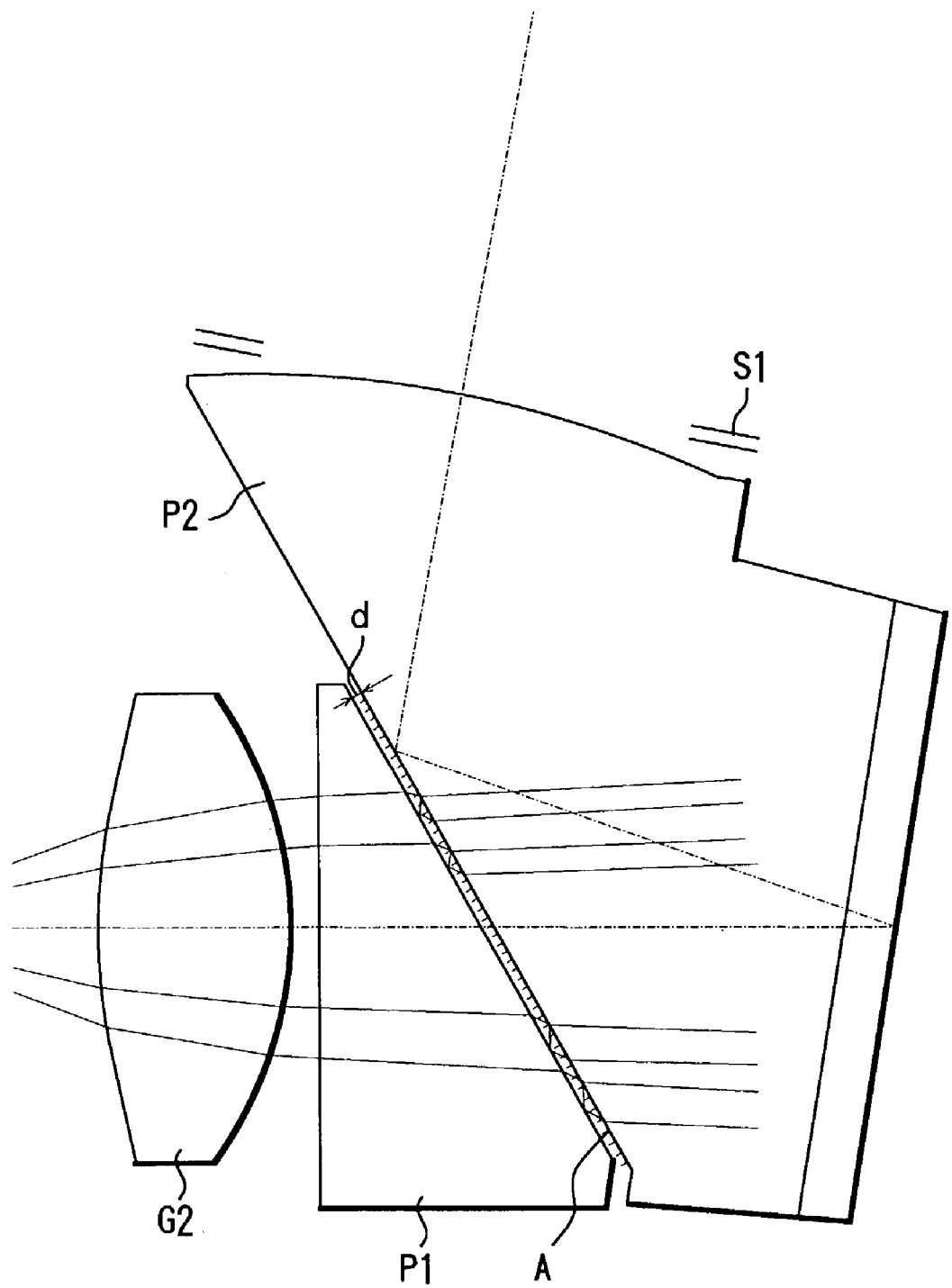
FIG. 5 is a schematic view of the principal parts, illustrating the ghost light resulting from multiple reflection that occurs between prisms that are disposed close to each other.

With each of these embodiments, at the effective optical region of at least one of the two optical surfaces that sandwich the minute air interval d of the prisms P1 and P2, the same fine periodic structure A as that described with Embodiment 1 is formed integral to the corresponding prism. The ghost light resulting from multiple reflection in a minute air interval as shown in FIG. 5 can thereby be suppressed.

It is preferable to provide the fine periodic structure A at the effective optical region of at least one of the two optical surfaces that sandwich a minute air interval d especially when the minute air interval d is within the range defined below.

$$0 < d/fe < 0.1$$

Where d indicates the air interval and fe indicates the focal length of the ocular lens unit.

Also, in a case where the prism P1 and the ocular lens unit Le are disposed close to each other as shown in FIG. 7, the fine periodic structure A is preferably provided at the optical effective region of the emergent surface (the optical surface closest to the ocular lens unit Le) of the prism P1 as well.

With both FIG. 6 and FIG. 7, the prism P2 is the optical member closest to the primary image forming plane of the viewfinder optical system (substantially the position of the frame plate S).

Embodiment 4

Figure 8:
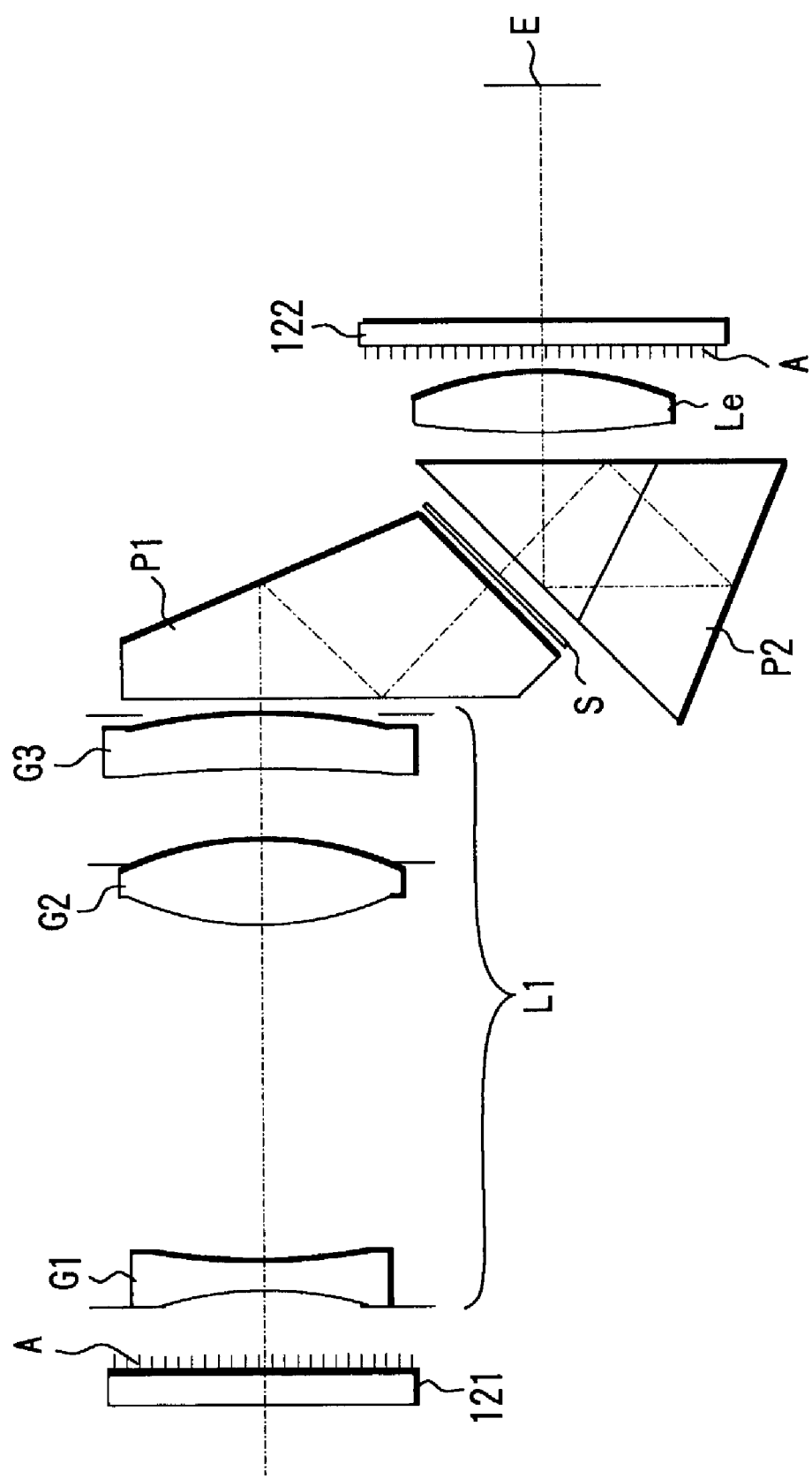
FIG. 8 is a sectional view of the principal parts of a viewfinder optical system of Embodiment 4 of the present invention.
Figure 9:
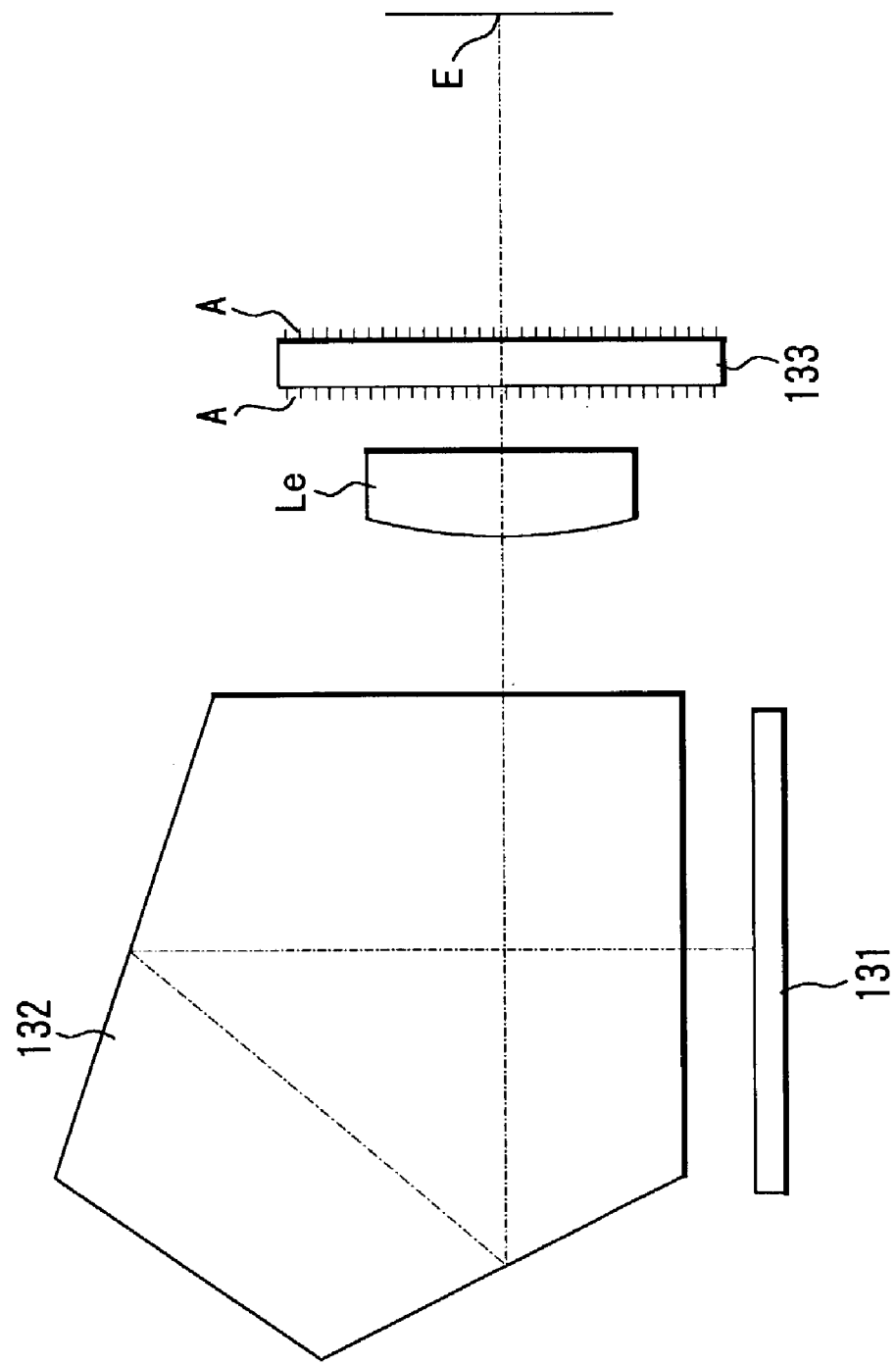
FIG. 9 is a sectional view of the principal parts of a viewfinder optical system of Embodiment 4 of the present invention.

Each of FIG. 8 and FIG. 9 shows a sectional view of the principal parts of a viewfinder optical system of Embodiment 4 of the present invention. The viewfinder optical system of FIG. 8 is a viewfinder optical system of a camera having an objective optical system separated from an unillustrated image-taking optical system, and with this viewfinder optical system, an object image formed near a frame plate S by an objective lens unit (comprising lens elements G1, G2, and G3) L1 is observed from an eye point E via an ocular lens unit Le.

In FIG. 8, an image inversion member, comprising plastic prisms P1 and P2, is disposed in an optical path from the objective lens unit L1 to the ocular lens unit Le and the optical path is bent thereby. Also, flat glass or plastic cover plates 121 and 122 are disposed at the object side of the objective lens unit L1 and the image plane side of the ocular lens unit Le.

The viewfinder optical system of FIG. 9 is a viewfinder optical system for a single-lens reflex camera and has a pentaprism 132, which makes use of reflection to perform image inversion, and an ocular lens unit (comprising a single lens element) Le, equipped in an optical path from a focal plate 131, onto which light that has been guided by an unillustrated mirror from an unillustrated image-taking optical system is made incident, to an eye point E.

A flat glass or plastic cover plate 133 is disposed at the image plane side (the side of the pupil of an observer) of the ocular lens unit Le.

With these viewfinder optical systems of FIG. 8 and FIG. 9, the same fine periodic structure A as that described with Embodiment 1 is formed integral to each of the cover plates 122 and 133 at the effective optical region of one surface or both surfaces of each of the cover plates 122 and 133.

Surface reflection ghost rays that can arise at the flat surfaces of the cover plates 122 and 133 are thus suppressed.

Though it is particularly preferable that the fine periodic structure A is provided at the surface (incident surface) at the inner side (object side) of each of the cover plates 122 and 133, in order to provide a viewfinder observation image of high definition, the fine periodic structure A may be provided at the surface (emergent surface) at the outer side (image plane side) of the cover plate 133 as shown in FIG. 9. In this case, it is preferable that the protective layer or the protective film is provided to improve durability of the fine periodic structure at the surface at the outer side.

Embodiment 5

Figure 10:
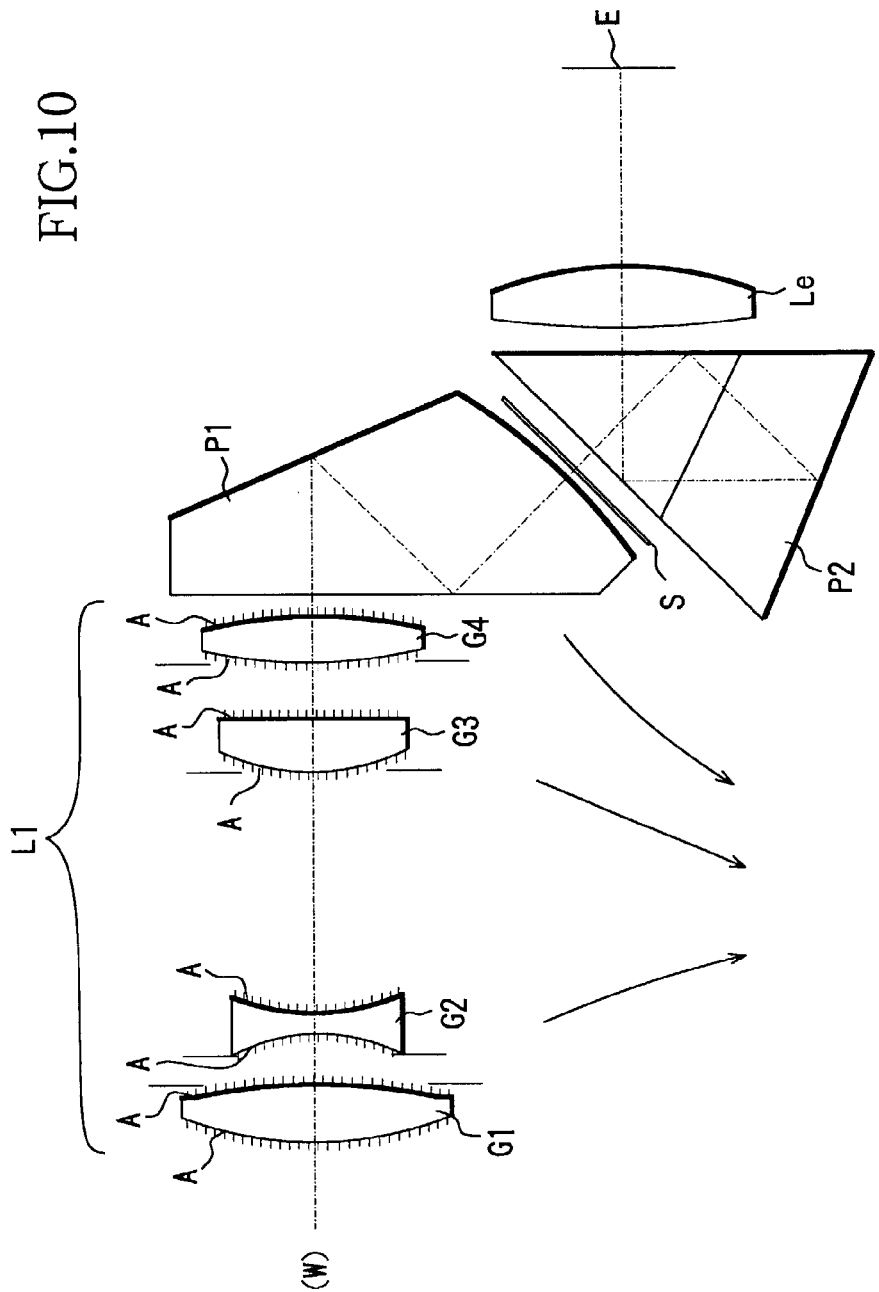
FIG. 10 is a sectional view of the principal parts of a variable magnification viewfinder optical system (wide angle end) of Embodiment 5 of the present invention.
Figure 11:
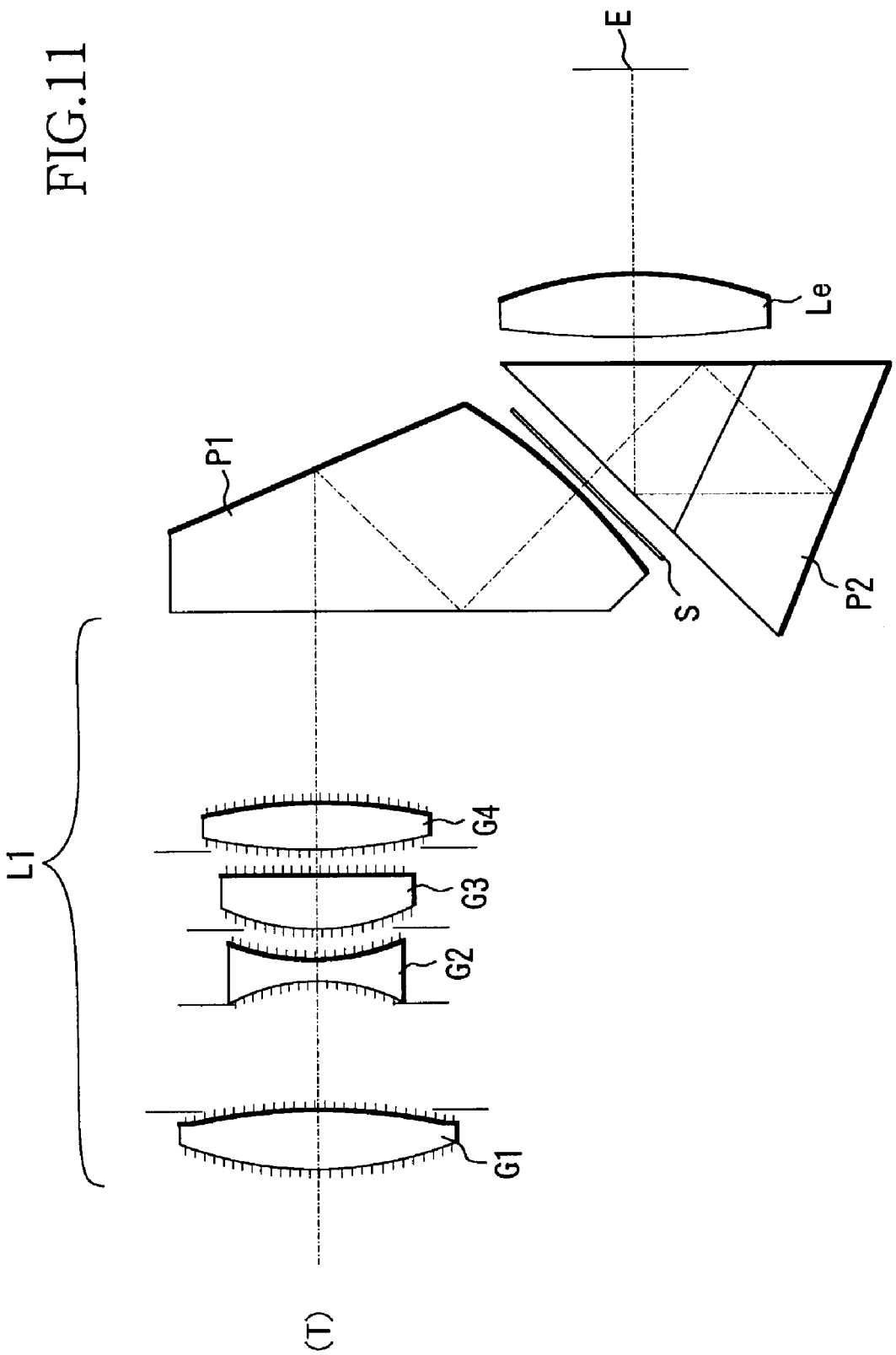
FIG. 11 is a sectional view of the principal parts of the variable magnification viewfinder optical system (telephoto end) of Embodiment 5 of the present invention.

Both FIG. 10 and FIG. 11 show a variable magnification viewfinder optical system of Embodiment 5 of the present invention. This viewfinder optical system is a viewfinder optical system for a camera having an objective optical system separated from an unillustrated image-taking optical system.

With this viewfinder optical system, an object image, formed near a field frame S by an objective lens unit L1, is observed from an eye point E via an ocular lens unit (comprising a single lens element) Le.

In an optical path from the objective lens unit L1 to the ocular lens unit Le, an image inversion member, comprising plastic prisms P1 and P2, is disposed and the optical path is bent thereby. In order from the object side, the objective lens unit L1 comprises a first lens element G1, having a positive optical power, a second lens element G2, having a negative optical power and having a concave surface directed towards the object side, a third lens element G3, having a positive optical power, and a fourth lens element G4, having a positive optical power. By the movement of the lens elements G2, G3, and G4 in the direction of the arrow in the Figures in accompaniment with a variation of magnification of the image-taking optical system, the magnification of this viewfinder optical system is varied as well. All of the lens elements G1, G2, G3, and G4 are made of plastic.

FIG. 10 shows the viewfinder optical system in the wide angle end and FIG. 11 shows the viewfinder optical system at the telephoto end condition.

With the present embodiment, fine periodic structures A that are integral to the respective lenses are provided at the effective optical regions of both surfaces of the respective lens elements G1, G2, G3, and G4 that make up the objective lens unit L1.

As a first effect of this structure, the Fresnel reflection at the lens surfaces in an objective lens unit, having a multiple lens unit arrangement with a large number of optical surfaces, can be reduced to obtain a so-called "clear" viewfinder image.

Also, the three lens elements, which are moved when the magnification is varied, are set at positions at which their respective intervals are small in some of the conditions from the wide angle end condition to the telephoto end condition. For example, in the wide angle end condition shown in FIG. 10, the lens elements G1 and G2 are set close to each other and the lens elements G3 and G4 are set close to each other. In the telephoto end condition shown in FIG. 11, the intervals among lens elements G2, G3, and G4 become small.

In such a case, as a second effect of the present arrangement, the fine periodic structures A suppress the surface reflection ghost that arises among the respective optical surfaces. The occurrence of the surface reflection ghost can thus be suppressed even if the intervals among the lenses become small.

With the present embodiment, since the fine periodic structures A can be formed along with the lens by means of an integral mold, a reflection suppressing structure can be provided at each surface of an objective lens unit while achieving compact size and resisting increases in cost, and a viewfinder optical system of improved field of view can be realized.

With the present invention's fine periodic structure, the grating period P, grating depth D, and grating width W may be varied within a single optical surface. Desired transmittance characteristics can thereby be obtained in accordance with variations of the incident angle of light.

Figure 16:
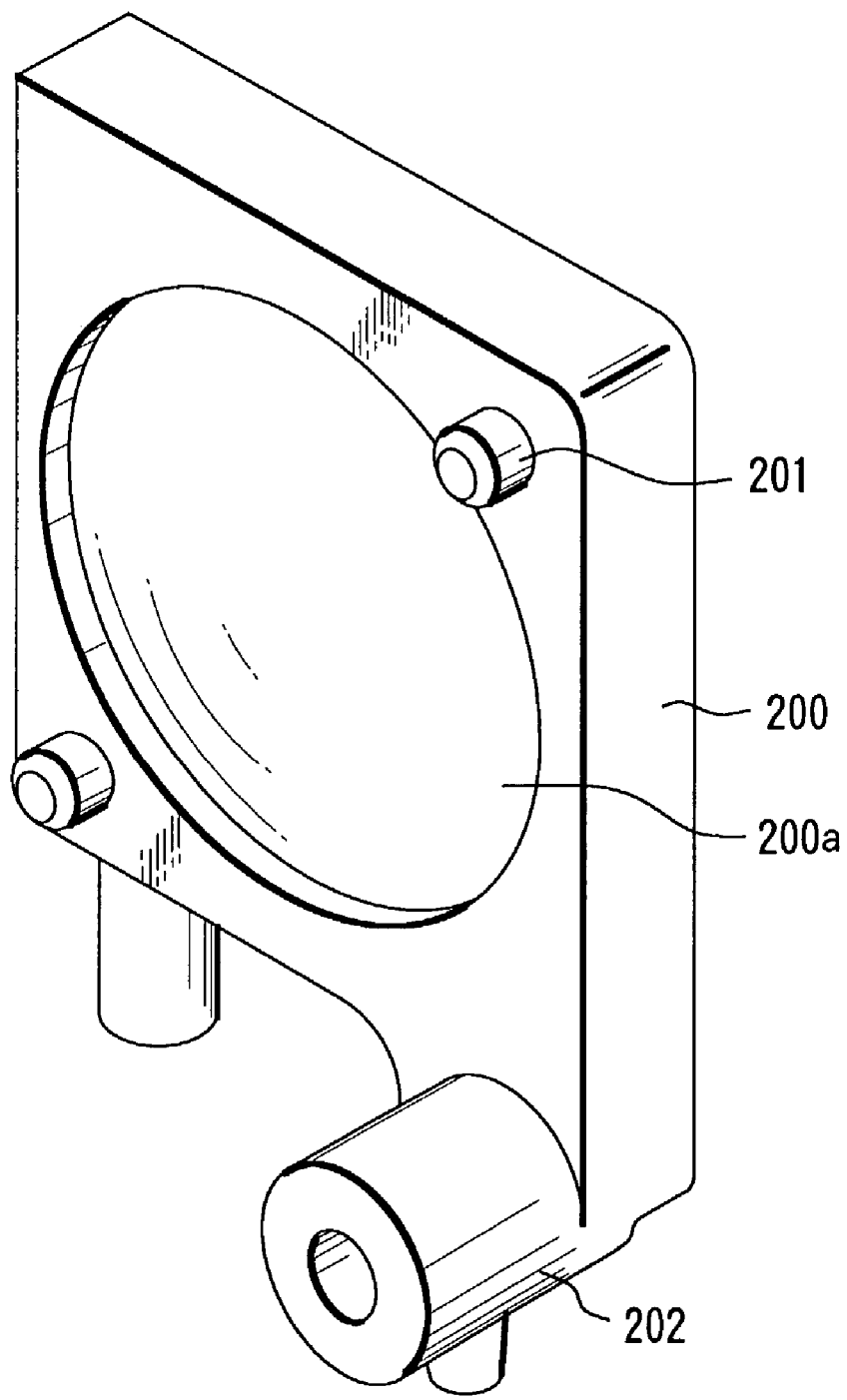
FIG. 16 is a schematic view of a lens having protruding shapes.

Also, with a lens 200, which, as shown in FIG. 16, has protrusions 201, 202, etc. that protrude in a direction parallel to an optical axis with respect to a lens surface 200a at the outer side of the lens surface 200a, it is difficult to vapor deposit a prior-art anti-reflection film on just the lens surface 200a, and the cost and the manufacturing processes are thereby increased.

Even with such a lens having a shape that differs from a generally used shape, since a fine periodic structure such as that described above can be formed integrally on just the lens surface, a lens surface with a reflection suppressing effect can be realized without increases in cost and manufacturing processes.

With an objective lens unit of a viewfinder optical system, such as those shown in FIG. 1 and FIG. 10, by providing a fine periodic structure such as that described above on the lens surface of the lens element at the object side at which the incident angle of light is large, a high-performance viewfinder optical system, with which such optical characteristics as the reflectance and transmittance will not vary according to differences in the incident angle of light, can be realized without increases in cost and manufacturing processes.

Furthermore, though viewfinder optical systems for cameras were described above in regard to the embodiments, the present invention may also be applied to observation optical systems of monocular telescopes and binoculars.

As has been described above, with the present invention, since a fine periodic structure with a period smaller than the wavelength of incident light is provided at an effective optical region of at least one surface among a plurality of optical surfaces included in an observation optical system, the Fresnel reflection at the surface of the optical member can be reduced, the transmittance can be improved, and the surface reflection ghost that occur among the plurality of optical surfaces can be suppressed without making the observation optical system large.

Moreover, since the fine periodic structure can be formed integral to an optical member in a case where the optical member is formed of a plastic material, it will not lead to increases in manufacturing cost and manufacturing processes and will enable a stable quality to be obtained.

While preferred embodiments have been described, it is to be understood that modification and variation of the present invention may be made without departing from the sprit or scope of the following claims.

What is claimed is:

1. An observation optical system comprising:
a plurality of optical surfaces; and
an ocular optical system,
wherein a periodic structure, with a period smaller than the wavelength of incident light, is formed on at least one of the optical surfaces,
the periodic structure is provided at an effective optical region of at least one surface among two mutually opposing optical surfaces of the optical surfaces,
the ocular optical system guides light that has passed through the two optical surfaces to an eye of an observer,
the two optical surfaces are disposed with an air interval therebetween, and the air interval d satisfies the condition:

$0 < d/fe < 0.1$ where fe is the focal length of said ocular optical system.

2. The observation optical system according to claim 1, wherein the period P of the periodic structure satisfies the condition:

$45\ nm \leq P \leq 320\ nm.$

3. An observation optical system comprising:
an objective optical system; and
an ocular optical system having an optical member and guiding light from the objective optical system to an eye of an observer,
wherein the optical member includes a plurality of optical surfaces and is formed of a plastic material;
wherein a periodic structure, with a period smaller than the wavelength of incident light, is formed on at least one surface of the plurality of optical surfaces and is formed integral to the optical member; and
wherein the refractive index n of the material of the periodic structure satisfies the condition:

$1.2 \leq \sqrt{n} \leq 1.27.$

4. The observation optical system according to claim 3, wherein the period P of the periodic structure satisfies the condition:

$45\ nm \leq P \leq 320\ nm.$

5. The observation optical system according to claim 3, wherein the periodic structure is provided at an effective optical region of at least one surface among two mutually opposing optical surfaces of the plurality of optical surfaces.

6. The observation optical system according to claim 3, wherein the periodic structure is provided at an effective optical region of an optical surface of an optical member, among the plurality of optical surfaces, that is closest to a primary image forming plane in the observation optical system.

7. The observation optical system according to claim 3, wherein the periodic structure is provided at an effective optical region of the at least one surface.

8. An optical apparatus comprising:
the observation optical system according to claim 3.

9. In an ocular optical system which guides light from an objective optical system to an eye of an observer, an improvement comprising:
an optical member having a plurality of optical surfaces, the optical member formed of a plastic material,
wherein a periodic structure, with a period smaller than the wavelength of incident light, is formed on at least one surface of the plurality of optical surfaces and is formed integral to the optical member,
the refractive index n of the material of the periodic structure satisfies the condition:

$$1.2 \leq \sqrt{n} \leq 1.27.$$

* * * * *